US009669571B2

(12) United States Patent
Salzmann

(10) Patent No.: US 9,669,571 B2
(45) Date of Patent: Jun. 6, 2017

(54) METHOD FOR PRODUCING A COMPONENT FROM AN ORGANOMETALLIC SHEET AND MOULD

(71) Applicant: MAGNA Exteriors GmbH, Sailauf (DE)

(72) Inventor: Heiner Salzmann, Uhingen (DE)

(73) Assignee: MAGNA Exteriors GmbH, Sailauf (DE)

( * ) Notice: Subject to any disclaimer, the term of this patent is extended or adjusted under 35 U.S.C. 154(b) by 310 days.

(21) Appl. No.: 14/672,981

(22) Filed: Mar. 30, 2015

(65) Prior Publication Data
US 2016/0288383 A1    Oct. 6, 2016

(51) Int. Cl.
| B29C 45/00 | (2006.01) |
| B29C 45/14 | (2006.01) |
| B29C 45/56 | (2006.01) |
| B29C 45/26 | (2006.01) |
| B29K 703/00 | (2006.01) |

(52) U.S. Cl.
CPC .... B29C 45/14073 (2013.01); B29C 45/1418 (2013.01); B29C 45/14221 (2013.01); B29C 45/14786 (2013.01); B29C 45/5675 (2013.01); B29C 45/2628 (2013.01); B29C 2045/0027 (2013.01); B29C 2045/14245 (2013.01); B29K 2703/00 (2013.01)

(58) Field of Classification Search
CPC ............ B29C 45/0005; B29C 45/1418; B29C 2045/14245
See application file for complete search history.

(56) References Cited

U.S. PATENT DOCUMENTS 3,002,231 A * 10/1961 Walker .................... B29C 41/10
12/142 RS
4,783,298 A    11/1988 Oda

FOREIGN PATENT DOCUMENTS

| DE | 102009024789 A1 | 12/2010 |
| DE | 102011120903 A1 | 6/2013 |
| WO | WO-2011095399 A1 * | 8/2011 ............. B29C 70/54 |

* cited by examiner

Primary Examiner — James Sanders
(74) Attorney, Agent, or Firm — Jordan IP Law, LLC; Todd A. Vaughn

(57) ABSTRACT

A method for producing a component from a fiber-reinforced thermoplastic material referred to as an organometallic sheet, and which includes an arrangement of fibers embedded in a matrix of a thermoplastic material. To produce the component, the organometallic sheet is thermally shaped and then placed into an injection mold. A mold for carrying out a method for producing a component from a fiber-reinforced thermoplastic material is also provided.

16 Claims, 2 Drawing Sheets

METHOD FOR PRODUCING A COMPONENT FROM AN ORGANOMETALLIC SHEET AND MOULD

CROSS-REFERENCE TO RELATED APPLICATIONS

The present application claims priority 35 U.S.C. §119 to German Patent Publication No. DE 102014205896.1 (filed on Mar. 28, 2014), which is hereby incorporated by reference in its entirety.

TECHNICAL FIELD

Embodiments relate to a method for producing a component from a fibre-reinforced thermoplastic material referred to as an organometallic sheet, and which includes an arrangement of fibres embedded in a matrix of a thermoplastic material, wherein, to produce the component, the organometallic sheet is thermally shaped and then placed into an injection mould.

Embodiments also relate to a mould for carrying out a method for producing a component from a fibre-reinforced thermoplastic material.

BACKGROUND

A composite material is a combination of at least two or more different active substances, which have distinctly different physical or chemical properties. The composite material created from them combines the physical and/or chemical properties of its constituent parts. At the same time, the positive properties for the respective application are brought to the fore and the least desired property is suppressed. The components are in this case chosen and combined with one another in such a way as to exploit the specific properties of each substance that are required for the case in question.

Fibre-plastic composites are distinguished by great potential for lightweight construction and are therefore used for making products that are subjected to high loading. However, their outstanding weight-to-strength ratio may only be fully utilized if all the phases of the process development and product development are performed appropriately for fibre plastics. Because of their short processing cycle times in the thermoforming process, thermoplastic fibre-plastic composites are especially used today in many application areas. The thermoforming of continuously fibre-reinforced thermoplastic semifinished products, known as organometallic sheets, offers great potential as a shaping process. To reduce the number of steps in the process, the thermoforming is also carried out in the injection mould. However, this reduces the possible complexity of the organometallic sheet used as a blank. Apart from the advantages mentioned, the clever combination of the thermoforming of organometallic sheets with the injection-moulding process also allows the costs for producing complex components to be reduced.

Organometallic sheets include special fabrics that are embedded in defined orientations in a thermoplastic matrix. The fabrics are produced from glass fibres, Kevlar fibres or carbon fibres. Polyamide is suitable, for example, as the thermoplastic matrix, for one reason because it exhibits good adhesion to the fibres. This results in hybrid components that consist entirely of plastic. In comparison with components of sheet metal, they are lighter and display greater surface stiffness and much higher strengths. Apart from the classic hybrid components, the application potential applies especially to components that must have great surface stiffness, such as, for example, spare wheel recesses. Moreover, add-on parts such as reinforcements or clips may be integrated by being moulded on.

It is also possible to dispense with corrosion protection, which represents an additional cost factor in the case of metallic sheet. A mould for thermoforming organometallic sheets is much less expensive than a tool for deep drawing metal. It is therefore especially worthwhile producing hybrid components from organometallic sheet in the case of low to moderate numbers of such components.

For the production of components it may be necessary to provide clearances, for example, in the form of passages or openings, which have to be introduced into the organometallic sheet. If these clearances are introduced into the organometallic sheet after the thermoforming, in the cooled-down state, for example by drilling or punching of the organometallic sheet, the structure of the reinforcing fibres is destroyed at the location of the clearance, which may lead to a weakening of the material at the clearance and around the clearance.

German Patent Publication No. DE 102010001634 A1 discloses a method in which a mandrel widens the fabric of the matrix while the matrix is still soft and able to be shaped in the thermoforming process. By introducing the mandrel, the material is prematurely fixed and, if there are a number of apertures, wrinkling may occur, since the flow of the material may not adjust appropriately. It is also known to heat the matrix once again locally after the thermoforming and to introduce a mandrel at this place. However, this involves additional effort and leads to problems when producing a number of apertures.

SUMMARY

Embodiments relate to a method for producing a component from an organometallic sheet/organometallic hollow profile, with which clearances may be easily introduced into an organometallic sheet without the structure of the component as a whole being adversely affected.

Embodiments relate to a method for producing a component from a fibre-reinforced thermoplastic material, referred to as an organometallic sheet/organometallic hollow profile, having an arrangement of fibres embedded in a matrix of a thermoplastic material. The method includes at least one of the following: thermally shaping an organometallic sheet; placing the thermally shaped organometallic sheet into an injection mould; forming at least one clearance in the organometallic sheet by placing injection points of the injection mould in proximity of the clearances such that, during distribution of the thermoplastic material, an arrangement of fibres of the matrix is widened in dependence of the temperature by pushing a mandrel into the organometallic sheet at the location of the clearance to be formed, and the clearance formed in this way being encapsulated.

Embodiments relate to a method for producing a component from a fibre-reinforced thermoplastic material having an arrangement of fibres embedded in a matrix of a thermoplastic material, the method including at least one of: thermally shaping the fibre-reinforced thermoplastic material; placing the thermally shaped fibre-reinforced thermoplastic material into an injection mould having injection points and at least one mandrel; and forming at least one encapsulated clearance in the thermally shaped fibre-reinforced thermoplastic material by placing the injection points in proximity of the at least one encapsulated clearance to be formed, in a manner such that during distribution of the thermoplastic material, an arrangement of fibres of the matrix is widened in dependence on a measured temperature by pushing the at least one mandrel into the fibre-reinforced thermoplastic material at a location of the at least one encapsulated clearance to be formed.

Embodiments relate to a method for producing a component, the method including at least one of: thermally shaping a fibre-reinforced thermoplastic material having an arrangement of fibres embedded in a matrix of a thermoplastic material; placing the thermally shaped fibre-reinforced thermoplastic material into an injection mould having injection points and at least one mandrel; and forming at least one clearance in the thermally shaped fibre-reinforced thermoplastic material, by placing the injection points in proximity of the at least one clearance to be formed, in a manner such that during distribution of the thermoplastic material, an arrangement of fibres of the matrix is widened in dependence on a measured temperature by pushing the at least one mandrel into the fibre-reinforced thermoplastic material at a location of the at least one clearance to be formed.

Embodiments relate to a mould to produce components from an organometallic sheet having clearances, the mould including at least one of: an upper mould shell having at least one injection runner; and a lower mould shell having at least one mandrel displacable relative to the lower mould shell and which is to penetrate through a surface of the lower mould shell, and at least one slide for the at least one mandrel, the at least one slide to displace the at least one mandrel to produce a clearance in an injection moulded material during the moulding process.

Embodiments relate to a method for producing a component from a fibre-reinforced thermoplastic material ("an organometallic sheet") having an arrangement of fibres embedded in a matrix of a thermoplastic material. The method includes at least one of the following: thermally shaping the organometallic sheet; placing the organometallic sheet into an injection mould; forming at least one clearance in the organometallic sheet by placing injection points of the injection mould in proximity of the clearances; and then, widening, during the distribution of the plastic, the arrangement of fibres of the matrix in dependence on the temperature by pushing a mandrel into the organometallic sheet at the location of the clearance to be formed, and the clearance formed in this way being encapsulated.

The method in accordance with embodiments has the advantage that apertures or clearances may be easily provided exactly in position and by minimizing the overall number of process steps. The method makes it possible to reduce wrinkling and fibre tears in the fabric of the matrix.

The method in accordance with embodiments also has the advantage that at least one mandrel is pushed into the organometallic sheet during the injection moulding in a direction perpendicularly or substantially perpendicularly to a surface of the flat-extending organometallic sheet, so that a clearance penetrating the organometallic sheet is obtained.

The method in accordance with embodiments additionally has the advantage that integration of the production of the clearance in the injection-moulding process has the effect of eliminating the need for some working steps.

Advantageously, in a further method step, during the forming of the clearance, inserts that have been placed on the mandrel are moulded onto the organometallic sheet in the region of the clearance. In this way, the inserts are set and fixed by encapsulation with plastics material in one working step.

Advantageously, the injection points are positioned at a radial distance of up to 10 cm from the clearance to be produced.

The spatial proximity of the clearances to the injection point has the effect that the matrix is softened in the proximity of the injection point and may be easily penetrated by the mandrel.

The method in accordance with embodiments also has the advantage that the clearance to be produced lies within a flow path of the injection-moulding material.

The adaptation of the flow path in the mould allows a clearance that is somewhat further away from the injection point to be produced. Advantageously, the method is carried out in such a way that the production of the clearances is performed in a time-correlated manner with the introduction of the injection-moulding material by moving in mandrels on slides of the injection mould.

In this case, the injection-moulding material is introduced before the mandrels are pushed into the mould on the slides. As a result, the material is given time in advance to melt.

If a temperature sensor is used, it is advantageous that the introduction of the mandrels is performed in dependence on a temperature signal. This allows the point in time that is optimal for the introduction of the mandrels to be sensed.

Advantageously, the measured temperature at the sensor must exceed a minimum temperature in order to allow the movement of the slide with the mandrel.

An advantageous form of the mould for producing components from organometallic sheet with clearances having an upper and a lower shell (3, 5) and at least one slide for at least one mandrel, wherein the injection openings are provided at a radial distance of up to 10 cm from the positions of the slides with the mandrels.

DRAWINGS

Embodiments will be illustrated by way of example in the drawings and explained in the description hereinbelow.

DESCRIPTION

Figure 1:
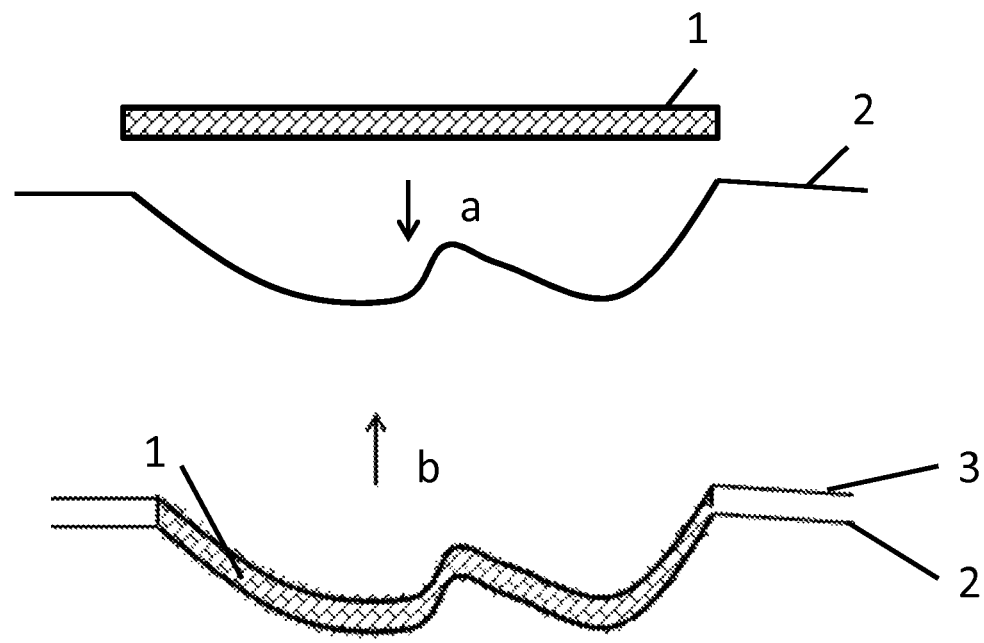
FIG. 1 illustrates a schematic representation of the method, in accordance with embodiments.

FIG. 1 illustrates a first step of the method for producing a component from a fibre-reinforced thermoplastic material referred to as an organometallic sheet. An organometallic sheet 1 is schematically represented. The pre-formed organometallic sheet blanks includes fibre scrims that are impregnated with a plastics material. The blanks may, in this case, take any form desired and may be adapted to the product. After placing the blank into the lower part 2 of a thermoforming mould, the thermoforming mould is closed by its upper part 3 moving in the direction a. By heating the blank with its plastic-impregnated matrix, the organometallic sheet 1 is brought into a three-dimensional shape. Subsequently, the organometallic sheet 1 is removed from the thermoforming mould, once the upper part 3 of the thermoforming mould has been moved upwards in the direction b.

Figure 2:
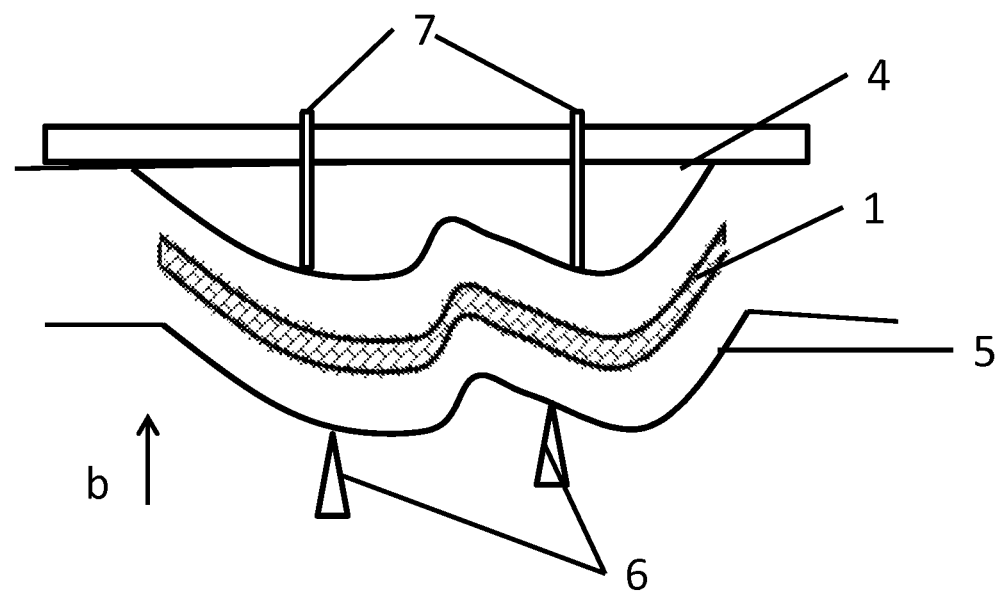
FIG. 2 illustrates a schematic representation of the method, in accordance with embodiments.

As illustrated in FIG. 2, another injection mould, in accordance with embodiments, includes upper part 4 and lower part 5. The three-dimensionally shaped organometallic sheet blank 1 is placed into the injection mould. It may be seen that the lower part 5 of the injection mould is provided with mandrels 6, which may penetrate through the surface of the lower part 5 and move in the direction b relative to the lower part 5. The upper part 4 of the injection mould has injection runners 7.

Figure 3:
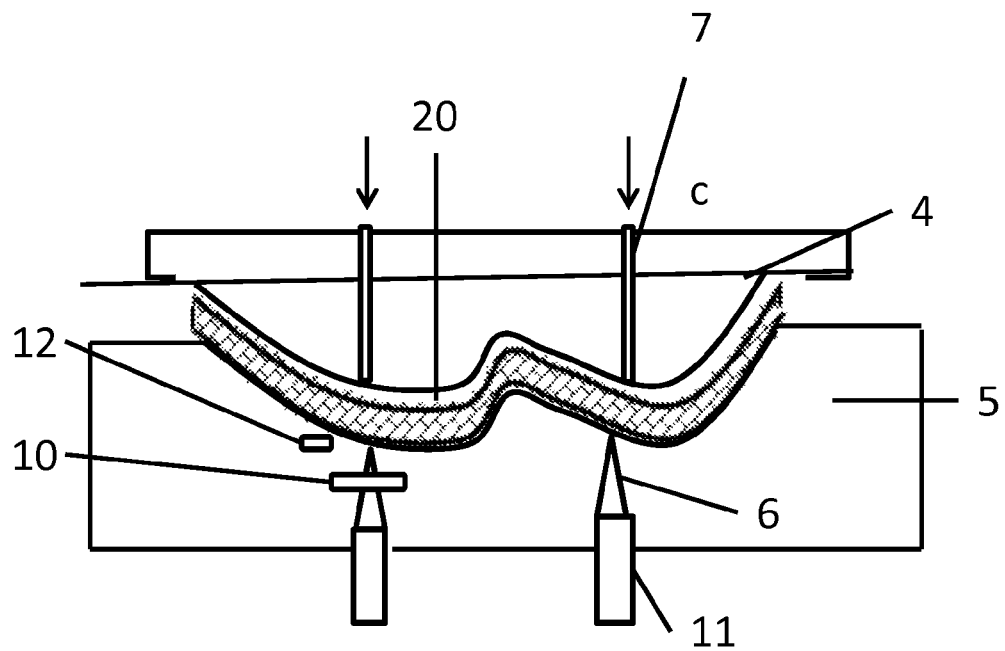
FIG. 3 illustrates a schematic representation of the method, in accordance with embodiments.

As illustrated in FIG. 3, the injection mould of FIG. 2 is in a closed state. Mandrels 6 are connected to slides 11, which may be displacable vertically relative to the lower mould part 5 (in the direction b). The left-hand mandrel 6 exhibits an insert 10, which is centred by the mandrel 6. A temperature sensor 12 is arranged in spatial proximity to the mandrel 6.

After the closing of the injection mould 4, 5, an injection space is created therein. Injection-moulding material is forced into the cavity via the injection runners 7 in the direction c relative to the upper mould part 4.

In accordance with a first embodiment, after the beginning of the injection, a predetermined time $t_{hold}$ is left before the slides 11 are activated and the mandrels 6 are pushed into the organometallic sheet 1. In this case, the time $t_{hold}$ is chosen such that the matrix of the organometallic sheet 1 melts, and the introduction of the mandrels 6 is thus facilitated.

In accordance with another embodiment, the temperature sensor 12 is provided and which is to measure the temperature at a position in close proximity to the mandrels 6. When a temperature threshold $t_s$ is reached, the associated slide 11 is actuated and the mandrel 6 is moved in the direction of the organometallic sheet 1. It is also conceivable that a number of temperature sensors 12 may be used, respectively arranged adjacent to the mandrels 6.

The pushed-in mandrels 6 remain in the organometallic sheet 1 and are thus flowed around by the injection-moulding material. Only when the material has cooled down are the mandrels 6 withdrawn and the mould is opened.

It is also possible that the mandrels 6 are used to encapsulate further inserts 10, including on the upper side 20. For this purpose, the mandrels remain in their position as they penetrate the organometallic sheet 1, and thereby form a suitable centring point for the insertion of further components into the mould. The organometallic sheet 1 may subsequently be encapsulated once again.

Figure 4:
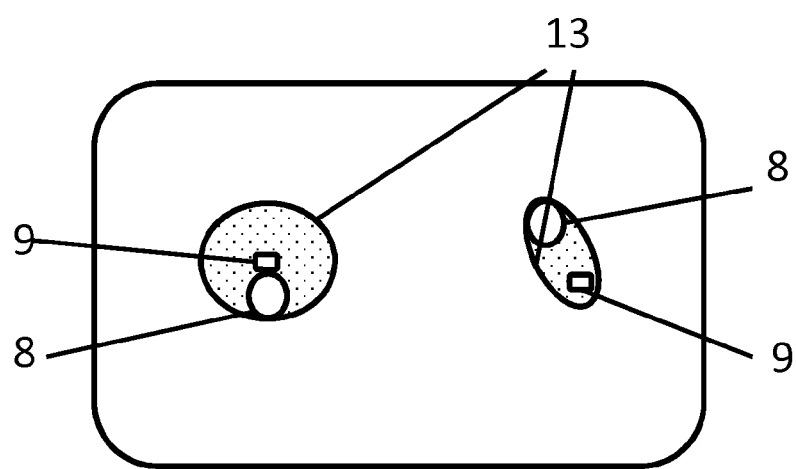
FIG. 4 illustrates a plan view of an organometallic sheet, in accordance with embodiments.

As illustrated in FIG. 4, a plan view of the organometallic sheet 1 has a pair of clearances 8, injection points 9 lying adjacent to the clearances 8. The injection points 9 in this case lie, for example, within a radial distance of less than 10 cm. However, such a restriction is not absolutely necessary, as long as injection-moulding material may flow over the place to be penetrated. In the case of a lateral runner, the mandrel 6 must be moulded in immediately after the flow front of the injected material comes to a standstill. With suitable component geometry, the distance between the injection point 9 and the clearance 8 may also be greater if a direction of flow of the plastics material that extends in the direction of the clearance is prescribed. In FIG. 4, two softening regions 13 are illustrated, on the one hand, extending circularly around the injection point 9, and on the other hand, following a direction of flow.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Organometallic sheet
2 Lower part of thermoforming mould
3 Upper part of thermoforming mould
4 Upper part of injection mould
5 Lower part of injection mould
6 Mandrel
7 Injection runner
8 Clearance
9 Injection point
10 Insert
11 Slide
12 Temperature sensor
13 Softening region
20 Upper side
a Direction of insertion
b Direction of removal
c Direction of injection

What is claimed is:

1. A method for producing a component from a fibre-reinforced thermoplastic material having an arrangement of fibres embedded in a matrix of a thermoplastic material, the method comprising:
   thermally shaping the fibre-reinforced thermoplastic material;
   placing the thermally shaped fibre-reinforced thermoplastic material into an injection mould having injection points and at least one mandrel;
   forming at least one encapsulated clearance in the thermally shaped fibre-reinforced thermoplastic material by placing the injection points in proximity of the at least one encapsulated clearance to be formed, in a manner such that during distribution of the thermoplastic material, an arrangement of fibres of the matrix is widened in dependence on a measured temperature by pushing the at least one mandrel into the fibre-reinforced thermoplastic material at a location of the at least one encapsulated clearance to be formed;
   wherein the injection points lie at a radial distance of up to 10 cm from the at least one encapsulated clearance to be formed.

2. The method of claim 1, wherein the at least one mandrel is pushed into the fibre-reinforced thermoplastic material during the injection moulding in a direction perpendicularly to a surface of the fibre-reinforced thermoplastic material.

3. The method of claim 1, further comprising, during the forming of the at least one encapsulated clearance:
   placing inserts on the at least one mandrel; and
   moulding the inserts onto the fibre-reinforced thermoplastic material in proximity of the at least one encapsulated clearance.

4. The method of claim 1, wherein the at least one encapsulated clearance to be formed lies within a flow path of the injection-moulding material.

5. The method of claim 1, wherein the forming of the at least one encapsulated clearance is performed in a time-correlated manner with the introduction of the injection-moulding material by moving in the at least one mandrel on slides of the injection mould.

6. The method of claim 5, wherein the pushing of the mandrels is performed in dependence on a temperature signal of a temperature sensor.

7. The method of claim 6, wherein the measured temperature at the sensor is to exceed a minimum temperature in order to allow movement of the mandrel.

8. The method of claim 1, wherein the fibre-reinforced thermoplastic material comprises an organometallic sheet.

9. A method for producing a component, the method comprising:
thermally shaping a fibre-reinforced thermoplastic material having an arrangement of fibres embedded in a matrix of a thermoplastic material;
placing the thermally shaped fibre-reinforced thermoplastic material into an injection mould having injection points and at least one mandrel;
forming at least one clearance in the thermally shaped fibre-reinforced thermoplastic material, by placing the injection points in proximity of the at least one clearance to be formed, in a manner such that during distribution of the thermoplastic material, an arrangement of fibres of the matrix is widened in dependence on a measured temperature by pushing the at least one mandrel into the fibre-reinforced thermoplastic material at a location of the at least one clearance to be formed;
wherein the injection points lie at a radial distance of up to 10 cm from the at least one encapsulated clearance to be formed.

10. The method of claim 9, wherein the at least one mandrel is pushed into the fibre-reinforced thermoplastic material during the injection moulding in a direction perpendicularly to a surface of the fibre-reinforced thermoplastic material.

11. The method of claim 9, further comprising, during the forming of the at least one encapsulated clearance:
placing inserts on the at least one mandrel; and
moulding the inserts onto the fibre-reinforced thermoplastic material in proximity of the at least one encapsulated clearance.

12. The method of claim 9, wherein the at least one encapsulated clearance to be formed lies within a flow path of the injection-moulding material.

13. The method of claim 9, wherein the forming of the at least one encapsulated clearance is performed in a time-correlated manner with the introduction of the injection-moulding material by moving in the at least one mandrel on slides of the injection mould.

14. The method of claim 13, wherein the pushing of the mandrels is performed in dependence on a temperature signal of a temperature sensor.

15. The method of claim 14, wherein the measured temperature at the sensor is to exceed a minimum temperature in order to allow movement of the mandrel.

16. The method of claim 9, wherein the fibre-reinforced thermoplastic material comprises an organometallic sheet.

* * * * *